United States Patent
Stahlkopf

(10) Patent No.: US 7,622,816 B2
(45) Date of Patent: *Nov. 24, 2009

(54) POWER CONTROL INTERFACE AND ENERGY STORAGE BETWEEN A WIND FARM AND A POWER TRANSMISSION SYSTEM

(75) Inventor: Karl E. Stahlkopf, Honolulu, HI (US)

(73) Assignee: Hawaiian Electric Co., Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/246,038

(22) Filed: Oct. 6, 2008

(65) Prior Publication Data

US 2009/0027002 A1 Jan. 29, 2009

Related U.S. Application Data

(63) Continuation of application No. 11/302,054, filed on Dec. 12, 2005, now Pat. No. 7,432,611, which is a continuation of application No. 10/965,478, filed on Oct. 12, 2004, now Pat. No. 7,002,260, which is a continuation of application No. 10/687,795, filed on Oct. 17, 2003, now Pat. No. 6,858,953.

(60) Provisional application No. 60/435,643, filed on Dec. 20, 2002.

(51) Int. Cl.
*F03D 9/00* (2006.01)
*H02J 3/00* (2006.01)

(52) U.S. Cl. ........................... 290/44; 290/55; 363/34

(58) Field of Classification Search .................. 363/34, 363/37, 59, 60; 290/43, 44, 52, 54, 55
See application file for complete search history.

(56) References Cited

U.S. PATENT DOCUMENTS 5,384,489 A * 1/1995 Bellac ........................ 290/44
5,592,028 A * 1/1997 Pritchard ..................... 290/55

(Continued)

OTHER PUBLICATIONS

"Research of Possibilities of Introduction of Joint Battery Storage and Wind Power", New Energy & Ind Technology Dev Org, Feb. 2002, NEDO-NP-004.

(Continued)

*Primary Examiner*—Matthew V Nguyen
(74) *Attorney, Agent, or Firm*—Leighton K. Chong

(57) ABSTRACT

A power control interface between an unstable power source such as a wind farm and a power transmission line employs an electrical energy storage, control system, and electronic compensation module which act together like an "electronic shock absorber" for storing excess power during periods of increased power generation and releasing stored energy during periods of decreased power generation due to wind fluctuations. The control system is provided with a "look ahead" capability for predicting power output (wind speed conditions) and maintaining energy storage or release over a "narrow-band" range despite short duration fluctuations. The control system uses data derived from monitoring the wind farm power output and the power transmission line, and employs system-modeling algorithms to predict narrow-band wind speed conditions. The power control interface can also use its energy storage capacity to provide voltage support at the point of injection into the power transmission system, as well as fault clearance capability for "riding out" transient fault conditions occurring on the power transmission line.

20 Claims, 4 Drawing Sheets

U.S. PATENT DOCUMENTS

| | | | | | |
|---|---|---|---|---|---|
| 5,798,632 | A | * | 8/1998 | Muljadi | 322/29 |
| 5,907,192 | A | * | 5/1999 | Lyons et al. | 290/44 |
| 6,420,796 | B1 | * | 7/2002 | Lagerwey | 290/44 |
| 6,605,880 | B1 | * | 8/2003 | Jaunich | 307/80 |
| 7,276,807 | B2 | * | 10/2007 | Luetze et al. | 290/44 |
| 7,298,059 | B2 | * | 11/2007 | Delmerico et al. | 307/85 |
| 7,372,173 | B2 | * | 5/2008 | Lutze et al. | 290/44 |
| 7,403,854 | B1 | * | 7/2008 | Hurley et al. | 702/3 |
| 2005/0156432 | A1 | * | 7/2005 | Hennessy | 290/44 |
| 2007/0108771 | A1 | * | 5/2007 | Jones et al. | 290/44 |
| 2007/0216163 | A1 | * | 9/2007 | Guang et al. | 290/44 |

OTHER PUBLICATIONS

"Wind Power—Battery Hybrid Systems", IEEE, Power and Energy Society, vol. 121-B, No. 6, Jun. 2001.

"Wind Energy", Japan Wind Energy Assoc., vol. 25, No. 2, Aug 2001.

* cited by examiner

Energy Storage Circuit

Output of Typical Wind Farm

POWER CONTROL INTERFACE AND ENERGY STORAGE BETWEEN A WIND FARM AND A POWER TRANSMISSION SYSTEM

This continuation U.S. Patent Application is filed with application Ser. No. 11/302,054 filed on Dec. 12, 2005, now issued as U.S. Pat. No. 7,432,611 on Oct. 7, 2008, which was a continuation of U.S. patent application Ser. No. 10/965,478, filed on Oct. 12, 2004 now issued as U.S. Pat. No. 7,002,260 on Feb. 21, 2006, which was filed as a continuation of U.S. patent application Ser. No. 10/687,795 filed on Oct. 17, 2003, now issued as U.S. Pat. No. 6,858,953 on Feb. 22, 2005, which claimed the benefit of the priority of U.S. Provisional Appl. 60/435,643, filed on Dec. 20, 2002.

TECHNICAL FIELD

This invention generally relates to a power control interface between a power source and a power transmission system, and more particularly, to an interface between the power output of an unstable power source such as a wind farm and a power transmission grid.

BACKGROUND OF INVENTION

Power generation using wind-driven windmills (turbines) is usable in areas that have good wind resources and that can benefit from the addition of wind-generated power into a local power transmission system (often referred to as "the grid"). However, wind turbines are relatively unstable power sources that fluctuate with wind conditions and must be properly interfaced to avoid carrying over instabilities into the grid. A wind farm connected to either a weakly supported transmission line or to a relatively small transmission system (such as for an isolated region or island) can inject instabilities in both voltage and frequency of the backbone transmission system because of the gusty and turbulent nature of the wind source. Even on a more robust, interconnected transmission system, such instabilities can create disturbances that propagate through the system.

As wind changes velocity over the area of the wind farm and interacts with individual windmills over varying time periods, and/or turbulent wind flow is created by passing weather systems, the energy output of the wind farm can change very rapidly—over a period of one second or less. This change in energy output of the wind farm is reflected by changes in both frequency and voltage in the transmission grid to which the wind farm is connected. In extreme cases, these fluctuations may become large enough that it is necessary to disconnect the wind farm from the transmission system and simply waste the wind energy. Such conditions have a strong economic impact on a wind farm, which recovers costs only when electricity is being generated. Under less extreme conditions, the shifting winds create energy surges that are reflected in lower-level voltage and frequency disturbances on the transmission system—over a period of 1-2 minutes.

To maintain transmission system stability under these circumstances, compensation is conventionally provided by load-following of the unstable power source with larger capacities of more stable generation units, such as fuel-fired or "thermal" generators. However, such load-following can subject these other units to excessive internal mechanical and thermal fatigue as they absorb fluctuations into their systems over long periods of time. This fatigue adds to both higher operations and maintenance costs, and shortens the overall unit lifetime.

It is also desirable to have a power source provide voltage support to the power transmission grid at the point of its interconnection. Such voltage support enables the power source to contribute to dampening voltage or frequency fluctuations on the transmission line at the point of power injection. In recent years, power flow controllers have been developed to compensate for transmission fluctuations by injecting a power offset varying in voltage and/or phase angle into the transmission system. An example of one type of power flow controller is described in U.S. Pat. No. 5,808,452 to Gyugyi et al. which employs a dc-to-dc converter using the dc voltage produced by a first static inverter connected in shunt with a transmission line to provide parallel reactive compensation to establish the magnitude of a series compensation voltage injected into the transmission line by a second static inverter. However, the various techniques for continuous compensation control are usually associated with the following practical disadvantages: increased circuit complexity and cost, increased losses, and increased harmonic content.

Fluctuations in the power transmission grid can also affect the interconnection of a power source with the grid. Transient conditions such as temporary power outages or flashovers on a transmission line can cause a power sources connected to the grid to become automatically disconnected by its safety circuitry, and would thus require a recloser or other relay type device to reconnect the power source back to the grid once the transient condition has passed. For small-contributor power sources, such as a wind farm, the addition of a recloser or relay device adds an undesirable additional cost to the system. For small power systems, such as an island grid, or a weakly supported interconnected grid where the wind farm represents a major generation source (above 5% of total power), if the wind farm is unable to immediately reconnect to the grid after the fault is cleared (referred to as fault ride through), there may be enough generation/load imbalance to cause the entire grid to shut down due to underfrequency.

SUMMARY OF INVENTION

It is therefore a principal object of the present invention to provide a power control interface between the power output of an unstable power source such as a wind farm and a power transmission line which isolates power fluctuations of the wind farm and prevents the injection of voltage or frequency instabilities into the grid during changing wind conditions. It is particularly desirable that this be accomplished with relative simplicity and at low cost while being highly effective in controlling the effects of both short- and long-term power fluctuations of the wind farm on the power transmission system. It is another object of the present invention to have the power control interface provide effective voltage support to the power transmission line at the point of injection of power output from the power source. It is still a further object of the invention that the power control interface provide a fault clearance capability to "ride through" a transient fault condition on the power transmission line, i.e., allow the power output to remain connected to the grid during transient fault conditions without the need to add a recloser or relay circuitry to the system.

In accordance with the present invention, a power control interface between a power output of an unstable power source such as a wind farm and a power transmission line comprises:

(a) an electrical energy storage coupled between the unstable power source and the power transmission line to store excess power output when it is above a normal output level of the unstable power source and to release stored electrical energy to add to the power output when it is below the normal output level of the unstable power source;

(b) a control system which receives a power source data signal derived from monitoring the power output of the unstable power source and a transmission line data signal derived from monitoring the power transmission line, and which determines when electrical energy stored in the electrical energy storage is to be released to add to power output to the power transmission line to compensate for conditions of decreased power generation encountered by the unstable power source, or when excess electrical energy generated during conditions of increased power generation encountered by the unstable power source is to be stored in the electrical energy storage; and (c) an electronic compensation module which receives a control signal from the control system corresponding to its determination and operates to release electrical energy stored in the electrical energy storage to add to power output to the power transmission line to compensate for decreased power source output, and to store excess electrical energy from increased power source output in the electrical energy storage in accordance with said determination.

In a preferred embodiment of the invention, the AC power output of the wind farm may be converted by an ac-to-dc inverter to direct current (DC) for storage in a DC capacitor array, ultracapacitors, or battery. The electrical energy storage is controlled by the electronic compensation module to act like an "electronic shock absorber", serving as both an energy source when the power output of the wind farm is temporarily decreasing below its normal range, and as an energy sink when power output from the wind farm is temporarily increasing above its normal range. This "shock absorbing" function has the effect of smoothing overall fluctuations in the power output of the wind farm and preventing the injection of frequency and voltage instabilities into the power transmission system. The electronic compensation module responds to control signals from the control system by issuing feedback signals to a pair of complementary "gates" on the input and output ends of the energy storage in order to store electrical power when the power output of the wind farm is temporarily decreasing below range, and to release electrical power into the power transmission system when the power output is temporarily increasing above range.

The control system is also provided with a "look ahead" capability for predicting wind speed conditions and maintaining the energy storage in a mode consistent therewith when wind fluctuations are in a "narrow-band" of short duration or small speed changes, in order to avoid out-of-sync responses due to time lag in the response of the system to real time conditions. The control system receives data signals derived from the wind farm power output representing information on the voltage, current, power and frequency output of the wind farm, and similar information derived from monitoring the transmission line. The control system employs system-modeling algorithms based on historical data of the wind farm output, meteorological data taken from the site, and meteorological predictions of the hour-ahead and day-ahead wind conditions, and compares current power output information from the wind farm with the calculations of the algorithms to predict narrow-band wind speed conditions. Based on this information, the control system sends a control signal to the electronic compensation module to remain in a mode to release energy from the energy storage to increase power output injected into the power transmission line or to store energy in the energy storage without adding to power output to the transmission line during narrow-band wind speed changes.

The power control interface can also provide voltage support for the power transmission system through the use of power electronics that convert DC power to AC and inject it into the transmission line at the proper voltage and phase angle in order to provide either real or reactive power depending on the stability needs of the transmission system. The power control interface can also provide fault clearance capability by adequately sizing the energy storage and controlling it to enable "riding out" of transient fault conditions occurring on the power transmission line. This may be particularly useful in island grid systems of small total capacity where the wind farm output may be a substantial power source contributor, or where other power source contributors may be weakly interconnected and become lost (disconnected) during a transient outage.

Other objects, features, and advantages of the present invention will be explained in the following detailed description of the invention having reference to the appended drawings.

DETAILED DESCRIPTION OF INVENTION

The following describes a preferred embodiment of a power control interface between the power output of an unstable power source such as a wind farm and a power transmission line to which the unstable power source is connected. The exemplary embodiment illustrates the function of the power control interface acting as an "Electronic Shock Absorber" which uses a combination of electrical energy storage and power electronics to isolate a power transmission system from wind farm energy fluctuations, while also enabling the wind farm to compensate for power disturbances on the line at the point of injection into the power transmission system. The Electronic Shock Absorber system can thus increase the overall capacity factor of the wind farm contribution to the grid, provide voltage support at the point of injection, and improve overall transmission system stability. The invention offers an unique solution to three major problems that have impaired wider use of wind energy as a renewable source of electricity generation.

Figure 1:
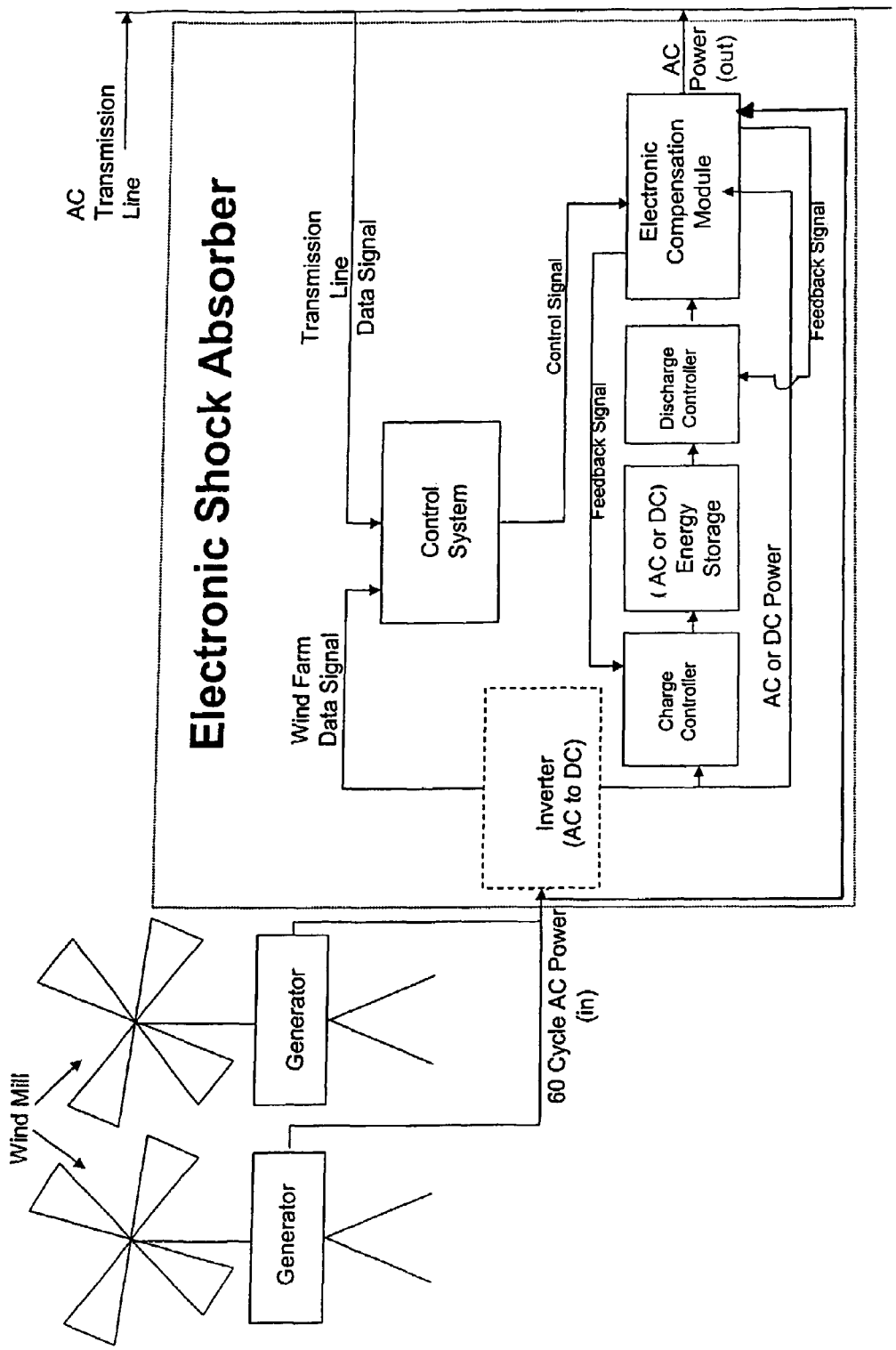
FIG. 1 is a system diagram illustrating a preferred embodiment of a power control interface between the power output of an unstable power source such as a wind farm and a power transmission line in accordance with the present invention.

Referring to FIG. 1, the power control interface of the present invention (referred to as the "Electronic Shock Absorber" within the dotted lines in the figure) is coupled between conventional 60 hertz (cycle) AC power output from windmill generators of a wind farm (power output in) and an AC transmission line which transmits power output (out) from the wind farm to a power transmission grid. The three main components of the Electronic Shock Absorber are labeled as "Energy Storage", "Control System", and "Electronic Compensation Module". The Energy Storage is coupled between the power output of the wind farm and the power transmission line. The Control System receives a Wind Farm Data Signal derived from monitoring the wind farm power output, which provides information on the voltage, current, power and frequency output of the wind farm, and a Transmission Line Data Signal derived from monitoring transmission line conditions, which provides similar information on the transmission line. On the basis of the Wind Farm Data Signal and the Transmission Line Data Signal, the Control System provides a control signal to the Electronic Compensation Module, which is coupled to the output of the windmill generators, to either store excess energy from rising wind farm power generation above the norm or release energy to the power transmission line to compensate for wind farm power generation below the norm. The Electronic Compensation Module responds to the control signal from the Control System by issuing feedback signals to a pair of complementary "gates" on the input and output ends of the Energy Storage, referred to in the figure as the "Charge Controller" and the "Discharge Controller". These have the function of either releasing stored energy from the energy storage to compensate for decreasing wind farm power generation or adding electrical energy to the energy storage during rising power generation. The Control System employs system-modeling algorithms in a "look-ahead" function (described further below) to predict fluctuations in the expected power output of the wind farm to control the storage or release of power in or from the energy storage when power fluctuations are in a "narrow-band" of short duration changes.

The capacity of the Energy Storage is sized to balance cost considerations with having sufficient capacity to accommodate power fluctuations typically encountered in a given wind farm as well as additional capacity for "ride through" of transient fault conditions and for reserve. Since storage capacity is relatively expensive, the capacity is sized to be about 1.5 times the typical expected maximum power excursion for the limiting condition for the stability of the power system, to which the wind farm is connected. Detailed calculations will have to be performed for each specific application of the Electronic Shock Absorber with considerations given to grid stability, acceptable ramp rate (up and down), necessity for fault ride through, sub-minute power fluctuations tolerance, and detailed wind regime characteristics to accurately size the storage component of the system.

The Energy Storage, which is controlled by the Electronic Compensation Module, offsets voltage and frequency changes in the wind farm output and reduces fluctuations in the power output to the transmission system in the following manner. When there is a sudden drop in the power output of the wind farm, for example, the Energy Storage will be operated by the Electronic Compensation Module to discharge energy to make up for any shortfall in energy output of the wind farm. Conversely, when the power output of the wind farm suddenly increases, the Control System will cause the Energy Storage to charge, and thereby blocking any addition from Energy Storage to the wind farm power output to the transmission system. This compensation has the effect of smoothing the overall fluctuation in frequency and voltage on the transmission system. It should be noted that the purpose of the power control interface is to smooth the power output of the wind farm to the transmission system and not to provide energy storage for use in off-peak hours, as is normal with many wind power systems. Because of the unique nature, purpose and control of this energy storage system, its capacity can be limited to energy storage equivalent to a few tens of seconds of wind farm energy output. This relatively small storage capacity significantly reduces the overall size and capital cost of the Electronic Shock Absorber.

While the Electronic Shock Absorber is operated automatically to smooth power output fluctuations when the fluctuations are large increases or decreases (e.g., more than 10%) from normal design-rated wind speed range and extend over a design-rated time window (e.g., 6 to 10 second), it becomes less efficient to operate the Electronic Shock Absorber automatically when the wind fluctuations are sharp (e.g., less than 5 seconds duration) or small changes (e.g., less than 10% of the normal power output range). This is because the response of the Control System will have a certain time lag (e.g., 0.1 to 0.2 seconds) in relation to real time conditions, and operation with automatic energy release/store changes that lag actual wind speed conditions may result in the Electronic Compensation Module causing the Energy Storage to store energy when actual wind speed is falling and release energy when actual wind speed is rising. This type of out-of-sync condition would reduce the overall efficiency of the system and/or might introduce power fluctuations into the transmission system. For smoothing these narrow-band fluctuations, the power control interface is provided with a "look ahead" capability to predict the likely wind speed conditions within the narrow band range and maintain the Energy Storage in a mode consistent with the predicted wind speed conditions despite sharp duration or small wind speed changes.

Figure 2:
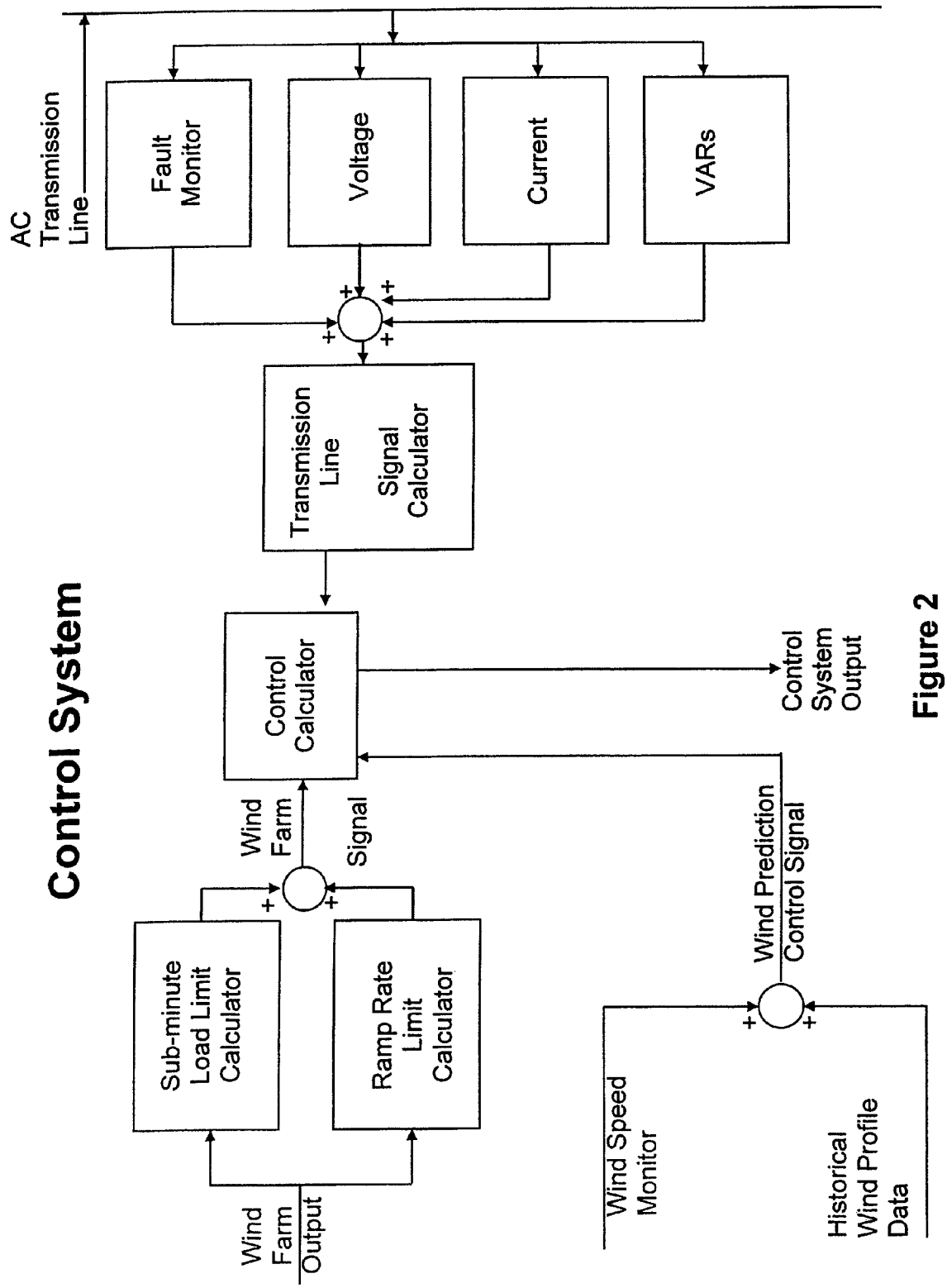
FIG. 2 is a block diagram illustrating an example of a control system for the power control interface.

As illustrated in greater detail in FIG. 2, a preferred embodiment of the Control System has a Transmission Line Control Signal Calculator which processes signals derived from monitoring the status of the AC transmission line, including a fault monitor, voltage magnitude, current magnitude, and VARs variations (volt-amperes reactive), and provides a Transmission Line Data Signal to the main Control Calculator. The Wind Farm Data Signal is a composite of a Sub-minute Load Limit Calculator and a Ramp Rate Limit Calculator monitoring the wind farm output, and a Wind Prediction Control Signal which is based on Wind Speed Monitor Data and Historical Wind Profile Data. As used herein, the term "calculator" refers to any means (e.g., a microprocessor) for processing input signals in accordance with programmed rules, steps and/or algorithms in order to determine and issue a corresponding output signal. Based on these inputs, the Control Calculator determines the appropriate control signal for the Control System Output. The Wind Prediction Control Signal is determined in accordance with prediction algorithms (examples described below) for judging whether current power generation conditions will rise above or fall below the normal power output range for the wind farm, in order to dampen the system's response to fluctuations in the wind farm power output of short duration. The Control System Output is provided to the Electronic Compensation Module to maintain the Energy Storage in a mode consistent with the predicted power output within the range of narrow-band fluctuations.

An example of relevant inputs for the "look ahead" function of the Power Output Analysis Module during narrow-band fluctuations is provided in Table I below (actual data would be site specific):

TABLE I

Current Wind Farm Data:

| | |
|---|---|
| Date: | Month: __ Day: __ Year: __ |
| Current wind speed: | ____ mph |
| Current temperature: | ____ degrees F. |
| Current barometric pressure: | ____ mbar |
| Weather day characterization: | Clear/Cloudy/HighW/LowW/GustyW |
| Number of turbines online: | ____ turbines |
| Total current power output: | ____ MW |

System Comparison Data:

| | |
|---|---|
| Turbine design rating, normal range: | ____ KVA |
| Wind speed design rating, normal range: | ____ mph |
| Number of turbines rated online: | ____ turbines |
| Total design rated power output, normal range: | ____ MW |
| Historical wind speed/hour: | ____ mph |
| Historical wind speed/day-ave: | ____ mph (ave) |
| Historical temperature: | ____ degrees F. |
| Historical barometric pressure: | ____ mbar |
| Historical weather day characterization: | Clear/Cloudy/HighW/LowW/GustyW |

Power Output Look-Ahead Prediction:

| | |
|---|---|
| Expected wind speed deviation from norm/hour: | ____ mph above/below norm |
| Expected wind speed deviation from norm/day-ave: | ____ mph above/below norm |
| Expected power deviation from norm/hour: | ____ MW above/below norm |
| Expected power deviation from norm/day-ave: | ____ MW above/below norm |

The Control System receives the above types of information on current wind farm conditions and AC transmission line conditions to provide the "look-ahead" function for predicting power output within the range of narrow-band fluctuations. As one example, the Control System can employ certain system modeling algorithms to act as a state estimator to determine whether to store excess generated energy or release stored energy to the transmission system during narrow-band wind speed changes. This state estimation is used to provide the appropriate control signals to the Electronic Compensation Module. An example of system modeling algorithms that might be used for predictive determination for the "look ahead" function is given in Table II below.

TABLE II

Figure 3:
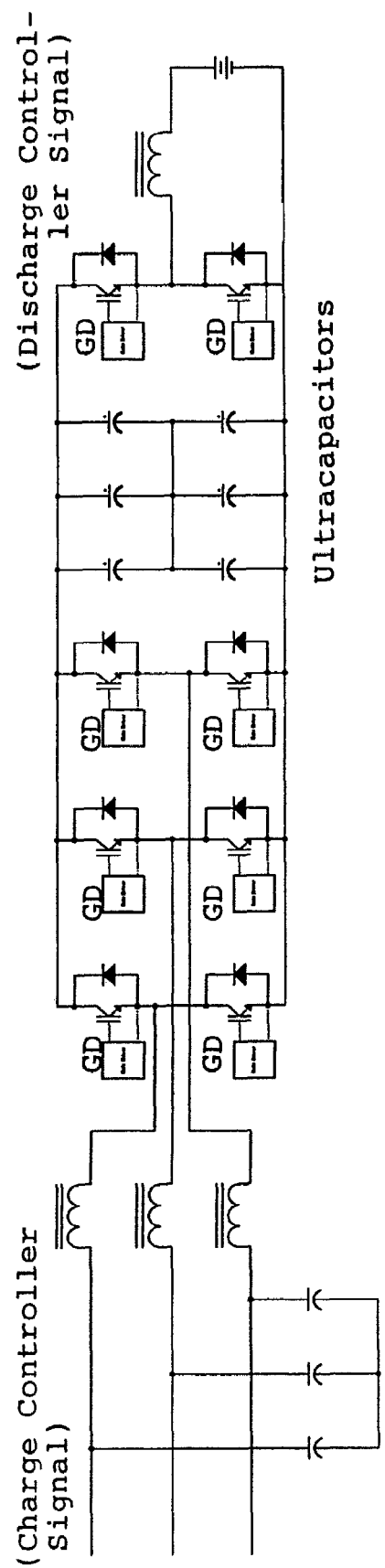
FIG. 3 is a simplified diagram of an energy storage circuit for the power control interface.

1. IF: Current day ave. wind speed > 110% normal (design rated) wind speed range
    OR
    Current day ave. wind speed < 90% normal wind speed range
        THEN: Allow Energy Storage to operate release/store automatically.
2. IF: 90% < current day ave. wind speed < 110% normal wind speed range
    AND
    Current day type = historical day type, AND historical wind speed > normal range
        THEN: Put Energy Storage gates in storage mode
3. IF: 90% < current day ave. wind speed < 110% normal wind speed range
    AND
    Current day type = historical day type, AND historical wind speed < normal range
        THEN: Put Energy Storage gates in release mode
4*. IF: Fault condition is detected in transmission line data (* For fault clearance)
        THEN: Put Energy Storage gates in release mode In FIG. 3, a simplified example of an Energy Storage circuit used as a "shock-absorber" in the power control interface is shown. The Energy Storage circuit is controlled by signals from the Charge and Discharge Controllers which act like double-action gates controlled by signals from the Electronic Compensation Module in response to the control signal received from the Control System. The Energy Storage circuit shown includes an array of ultracapacitors which can store AC power in and release AC power out. A number of stages (here 3 stages) of complementary thyristors acting as inverters are used to store power in the ultracapacitors in stages. The thyristors are controlled by the gate drivers GD. When the Energy Storage circuit receives a "charge" signal from the Charge Controller, input power is passed through the input LC circuit to ramp up energy for storage. One stage of complementary thyristors is used to release power from the ultracapacitors. When a "discharge" signal is received from the Discharge Controller, energy is released by the output thyristors through the output transformer circuit. The release of power from the Energy Storage is continued as long as the control signal from the Control System specifies the release mode.

The number and capacities of the ultracapacitors included in the circuit is determined based on a tradeoff of the shock-absorbing capacity desired versus storage costs. When the charging level of the Energy Storage reaches its total capacity, the Charge Controller transitions the excess power back to the Main Power Output Node (the Energy Storage is filled). The Energy Storage circuit components are selected so that smooth transitions are made in power storage and release without causing anomalies in the system. As an alternative Energy Storage circuit, the AC wind farm output can be converted by an ac-to-dc inverter to direct current (DC), and the energy storage is provided by an array of DC capacitors or battery storage units.

Figure 4:
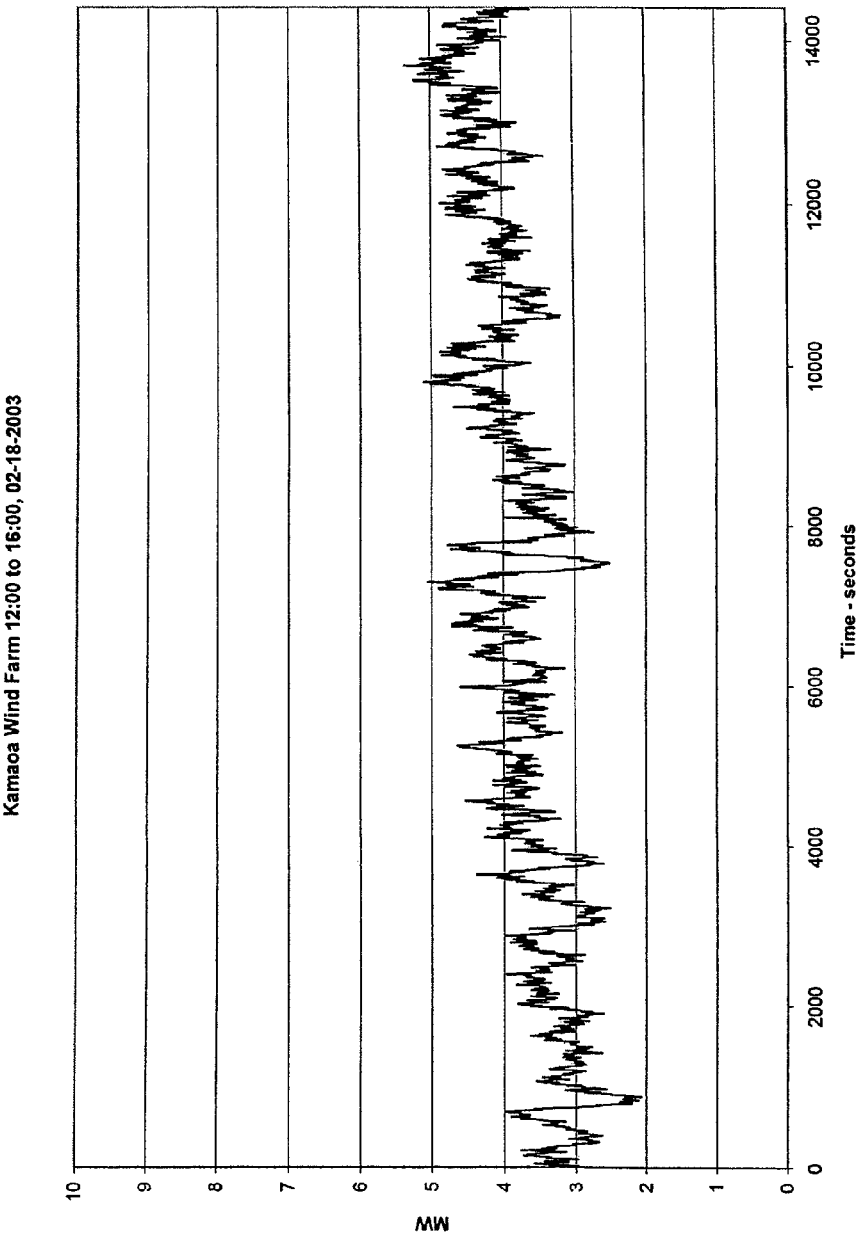
FIG. 4 is a chart showing the output of a typical wind farm characterized by large power fluctuations.

The shock-absorber function of the power control interface of the present invention allows the wind farm power output to be stored during periods of excess power generation and released to supplement the power injected into the AC transmission line during declining power generation. Since wind farm output (wind speed and gusting conditions) can vary considerably over short durations, the power control interface utilizes the power output predictive function to maintain the energy storage or the energy release mode despite short-duration fluctuations. An example of the high variability of power output of a typical wind farm is shown in FIG. 4 (for the time scale in seconds, 3600 seconds equals one hour).

The Electronic Shock Absorber can also enable a wind farm to help reinforce the transmission system, i.e., provide voltage support, against power problems originating elsewhere on the transmission system. On a relatively weak transmission system that is thermally limited, i.e., has limited stable, fuel-fired power source contributors, maintaining proper voltage and phase angle in the transmission system can be frequently difficult. Ensuring that power flows in the right direction can depend on the timely injection of reactive power (measured in volt-amperes reactive—VARs) at critical points to support the voltage at the injection point. The Electronic Shock Absorber can use energy stored in the Energy Storage to make adjustments to the interconnect power output of the wind farm to supply more VARs as needed to support transmission system voltage in the area. Similarly, when power disturbances are created elsewhere on an interconnected transmission system, the Electronic Shock Absorber can react quickly to supply short bursts of real power (measured in Watts) that can help dampen the disturbances.

To provide voltage support, the power control interface can include an optional power electronics module that converts stored power into current or phase angle offsets for injection into the transmission line at the point of interconnect. The enables the power control interface to provide either real or reactive power, depending on the stability needs of the transmission system. This capability can be provided by power electronics circuitry similar to that known in the power industry as a "distribution static compensator" (D-STATCOM), which is a multi-pole inverter based on insulated gate bipolar transistor (IGBT) technology that injects current at the proper phase angle into a power line to compensate for power disturbances. The D-STATCOM technology is described in further detail in "Custom Power: Optimizing Distribution Services", by John Douglas, in the EPRI Journal, published by the Electric Power Research Institute (EPRI), Vol. 21, No. 3, Pages 6-15, May/June 1996, and is incorporated herein by reference. The voltage support capability can be readily implemented by having the Control System issue data signal inputs to the D-STATCOM power electronics circuitry indicating the current voltage level and phase angle on the transmission line derived from the Transmission Line Data Signal, thereby enabling the D-STATCOM power electronics circuitry to generate the necessary offsets for injection to the transmission line to compensate for the power disturbances.

Energy stored in the Electronic Shock Absorber can also provide ride-through capability for the wind farm to allow for fault clearance on the transmission system. Typically, when a ground fault occurs on a transmission system, a protective relay is used to open the connection of a power source contributor from the transmission line to protect its mechanical system from surge for a pre-set interval (generally 6-36 cycles) and then re-closes. Most ground faults—such as a tree limb touching a power line—are cleared by flashover within that interval. During that period, however, a wind farm equipped with a relay and recloser would be disconnected from the transmission system by its own protection devices, thereby potentially worsening the power loss problem in a small (island) transmission system and causing loss of power to customers. The Electronic Shock Absorber can be configured to use its energy storage capacity to "ride through" the flashover interval. This would obviate the need for the wind farm interconnection point to be equipped with a relay and recloser, and would allow it instead to compensate for the momentary loss of power on the transmission system. The fault clearance capability can be implemented by having the Control System issue a control signal for Release mode when a transient fault condition is detected from the Transmission Line Data Signal (see Item 4* in Table II).

It is to be understood that many modifications and variations may be devised given the above description of the principles of the invention. It is intended that all such modifications and variations be considered as within the spirit and scope of this invention, as defined in the following claims.

The invention claimed is:

1. A power control interface between a power output of an unstable power source such as a wind farm having an expected normal output level of power output during average operating conditions and a power transmission line, comprising:

(a) an electrical energy storage coupled between the unstable power source and the power transmission line to store its excess power output when it is above a normal output level of the unstable power source and to release stored electrical energy to add to its power output when it is below the normal output level of the unstable power source;

(b) a control system which includes a unstable power source monitoring means, a transmission line monitoring means, and a control means including an electronic compensation module coupled to the electrical energy storage for operating the electrical energy storage to store excess power output as stored electrical energy and to release stored electrical energy as added power output in accordance with signals from said unstable power source monitoring means and said transmission line monitoring means, wherein said electrical energy storage is configured to have a relatively small storage capacity sufficient to accommodate power fluctuations typically expected to be encountered in a narrow band range of fluctuations of the unstable power source; and (c) said electronic compensation module being operated in response to a narrow band range of fluctuations of the unstable power source so as to release electrical energy stored in the electrical energy storage to add to the power output to the power transmission line when the power output of the unstable power source is below its normal output level, and to store excess power output from the unstable power source in the electrical energy storage when the power output of the unstable power source is above its normal output level, whereby operation of the electronic compensation module in the narrow-band range of fluctuations enables use of electrical energy storage with a relatively small storage capacity to reduce energy storage costs.

2. A power control interface according to claim 1, wherein the power source is a wind farm providing an AC power output, and the power output is stored in a selected one of the group of electrical energy storage devices consisting of ultracapacitors, capacitors, and batteries.

3. A power control interface according to claim 1, wherein the power source is a wind farm providing an AC power output, and the AC power output is converted by an ac-to-dc inverter to direct current (DC) for storage in a DC capacitor array or battery.

4. A power control interface according to claim 1, wherein the electronic compensation module is operated by calculating what the power output of the unstable power source is likely to be over a narrow-band range of fluctuations and maintaining the release of electrical energy over the calculated narrow-band range.

5. A power control interface according to claim 1, wherein the power source is a wind farm, and the control system receives data signals derived from monitoring the power output of the wind farm, and data signals derived from monitoring conditions on the transmission line, and employs system-modeling algorithms to predict narrow-band wind fluctuation conditions based on said data signals.

6. A power control interface according to claim 5, wherein the control system's algorithms include prediction based on current data on wind farm output and historical data of wind farm output.

7. A power control interface according to claim 1, wherein the electrical energy storage includes an energy storage circuit, a charge controller at an input side of the energy storage circuit, and a discharge controller at an output side of the energy storage circuit for energy release.

8. A power control interface according to claim 7, wherein the charge controller and the discharge controller act like double-action gates controlled by signals from the electronic compensation module.

9. A power control interface according to claim 7, wherein the power source is a wind farm providing an AC power output, and the power output is stored in a selected one of the group of electrical energy storage devices consisting of ultracapacitors, capacitors, and batteries.

10. A power control interface according to claim 9, wherein the electrical energy storage is an array of ultracapacitors arranged to store electrical energy in respective stages.

11. A power control interface according to claim 1, further comprising power electronics circuitry for providing voltage support at the point of connection of the wind farm with the power transmission line for adjusting to power disturbances on the transmission line.

12. A power control interface according to claim 1, wherein the electrical storage capacity is sized to be about 1.5 times the typical expected maximum power excursion for the unstable power source.

13. A power control method for interfacing between a power output of an unstable power source such as a wind farm having an expected normal output level of power output during average operating conditions and a power transmission line, comprising:
  (a) providing an electrical energy storage coupled between the unstable power source and the power transmission line to store its excess power output when it is above a normal output level of the unstable power source and to release stored electrical energy to add to its power output when it is below the normal output level of the unstable power source;
  (b) providing a control system which includes a unstable power source monitoring means, a transmission line monitoring means, and a control means including an electronic compensation module coupled to the electrical energy storage for operating the electrical energy storage to store excess power output as stored electrical energy and to release stored electrical energy as added power output in accordance with signals from said unstable power source monitoring means and said transmission line monitoring means, wherein said electrical energy storage is configured to have a relatively small storage capacity sufficient to accommodate power fluctuations typically expected to be encountered in a narrow band range of fluctuations of the unstable power source; and
  (c) operating said electronic compensation module in response to a narrow band range of fluctuations of the unstable power source so as to release electrical energy stored in the electrical energy storage to add to the power output to the power transmission line when the power output of the unstable power source is below its normal output level, and to store excess power output from the unstable power source in the electrical energy storage when the power output of the unstable power source is above its normal output level, whereby operation of the electronic compensation module in the narrow-band range of fluctuations enables use of electrical energy storage with a relatively small storage capacity to reduce energy storage costs.

14. A power control method according to claim 13, further comprising calculating what the power output of the unstable power source is likely to be over a narrow-band range of fluctuations and maintaining the release of electrical energy or the storage of electrical energy in the electrical energy storage over the calculated narrow-band range.

15. A power control method according to claim 13, wherein the power source is a wind farm, and the control system receives data signals derived from monitoring the power output of the wind farm, and data signals derived from monitoring conditions on the transmission line, and employs system-modeling algorithms to predict narrow-band wind fluctuation conditions based on said data signals.

16. A power control method according to claim 15, wherein the control system's algorithms include prediction based on current data on wind farm output and historical data of wind farm output.

17. A power control method according to claim 13, wherein the electrical energy storage includes an energy storage circuit, a charge controller at an input side of the energy storage circuit, and a discharge controller at an output side of the energy storage circuit for energy release.

18. A power control method according to claim 17, wherein the charge controller and the discharge controller act like double-action gates controlled by signals from the electronic compensation module.

19. A power control method according to claim 13, further comprising providing voltage support at the point of connection of the wind farm with the power transmission line for adjusting to power disturbances on the transmission line.

20. A power control method according to claim 13, wherein the electrical storage capacity is sized to be about 1.5 times the typical expected maximum power excursion for the unstable power source.

* * * * *